United States Patent [19]
Takeuchi et al.

[11] Patent Number: 5,453,458
[45] Date of Patent: Sep. 26, 1995

[54] CORE-SHELL POLYMER AND PLASTISOL THEREFROM

[75] Inventors: Hiroshi Takeuchi, Toyonaka; Susumu Okatani, Takatsuki; Junji Oshima, Toyonaka, all of Japan

[73] Assignee: Takeda Chemical Industries, Ltd., Osaka, Japan

[21] Appl. No.: 242,448

[22] Filed: May 13, 1994

[30] Foreign Application Priority Data

May 14, 1993 [JP] Japan ................................ 5-113235

[51] Int. Cl.$^6$ .............................. C08K 5/12; C08K 5/11; C08F 265/02
[52] U.S. Cl. ................. 523/201; 524/143; 524/296; 524/297; 524/314; 525/242; 525/301; 525/902; 525/303
[58] Field of Search ......................... 523/201; 525/902, 525/242, 301, 303; 524/296, 297, 314, 143

[56] References Cited

FOREIGN PATENT DOCUMENTS

| 0282668 | 9/1988 | European Pat. Off. |
|---|---|---|
| 4034725 | 5/1992 | Germany ................................ 523/201 |
| WO92/07906 | 5/1992 | WIPO . |

Primary Examiner—Peter A. Szekely
Attorney, Agent, or Firm—Wenderoth, Lind & Ponack

[57] ABSTRACT

There is disclosed a core-shell polymer which comprises:
- (a) a core layer polymerized from a core forming monomer mainly comprising an aromatic monovinyl monomer; and
- (b) a shell layer polymerized from a shell forming monomer which comprises:
  - (b1) 25–95% by weight of an aromatic monovinyl monomer as a first monomer;
  - (b2) 5–40% by weight of at least one monomer selected from the group consisting of an α, β-ethylenically unsaturated carboxylic acid and a hydroxyalkyl ester of α, β-ethylenically unsaturated carboxylic acid as a second monomer; and
  - (b3) 0–70% by weight of a third monomer which is other than the first and second monomers and is copolymerizable therewith, wherein the shell layer is contained in an amount of 5–70% by weight based on the core-shell polymer, and the core-shell polymer having a weight average particle size of 0.1–50 micrometers.

There is further disclosed a plastisol which comprises the core-shell polymer dispersed in a liquid plasticizer.

20 Claims, No Drawings

CORE-SHELL POLYMER AND PLASTISOL THEREFROM

FIELD OF THE INVENTION

This invention relates to a core-shell polymer and plastisol produced using the same. More particularly, the invention relates to a plastisol which has high fluidity and excellent storability, and provides films or molded articles of excellent mechanical strength and toughness, and also to a core-shell polymer suitable for the production of such a plastisol.

DESCRIPTION OF THE PRIOR ART

A plastisol is composed of a liquid plasticizer having fine polymer particles dispersed therein, usually together with other additives such as fillers including pigments, and is in wide use as a molding material. When the plastisol is heat-treated at a suitable temperature, the polymer particles get mixed with the plasticizer, and when being cooled to normal temperatures, it solidifies to form a gelled material such as films or molded articles.

The plastisol is exemplified by one composed of a plasticizer having polyvinyl chloride dispersed therein, and such a plastisol is preferably used to form a protective coating on outer plates of automobiles. The polyvinyl chloride plastisol has many advantages. For example, it has an advantage that polyvinyl chloride particles are stably dispersed in a plasticizer for a long period of time without being plasticized by the plasticizer and with substantially no increase in viscosity when it is stored at normal temperatures, and yet when the plastisol is heat-treated at a suitable temperature, it gets well mixed with the plasticizer.

However, the polyvinyl chloride resin has disadvantages. It generates a toxic hydrogen chloride gas when it is burnt, and it is difficult to reuse the resin for the purpose of resource saving. Hence a new plastisol which will take the place of polyvinyl chloride plastisol is demanded from the standpoint of environmental protection.

In view of such background, a number of polymers formed of vinyl monomers which contain no halogens have been investigated for a component of plastisol in lieu of polyvinyl chloride. However, the polymers which have been heretofore proposed have many problems depending upon the degree of miscibility with a plasticizer combined therewith for the production of plastisols.

Firstly, for instance, some of the polymers get mixed with a plasticizer soon at normal temperatures when they are dispersed in a plasticizer, and hence the resultant plastisol is poor in storability. Secondly, some of the polymers form a plastisol together with a plasticizer, but the viscosity of the plastisol increases with time at normal temperatures, and hence such a plastisol is poor in fluidity. Thirdly, some of the polymers form a plastisol together with a plasticizer which is stable at normal temperatures, but when it is heated and then cooled back to normal temperatures, there is formed a gel from the inside of which the plasticizer used exudes to the surface of the gel on account of poor miscibility of the polymers with the plasticizer used. Finally, when a plastisol is comprised of a plasticizer and a polymer highly miscible therewith, such a plastisol provides a film poor in tensile strength. And on the other hand, when a plastisol is comprised of a plasticizer and a polymer poor in miscibility therewith, such a plastisol provides a brittle film poor in elongation. Thus in either case, the film is of no practical use.

On account of these problems remaining unsolved as above set forth, no plastisol has yet been put to practical use in liew of polyvinyl chloride plastisol.

For example, there is proposed a plastisol comprised of a polymer or a copolymer formed of alkyl methacrylates combined with a variety of plasticizers, as described in Japanese Patent Laid-open No. 51-71344. However, in this regard, there is a problem. As well known, the miscibility of polymer to plasticizers is contrary to the fluidity and storability of plastisol. Accordingly, for instance, some of the plastisols proposed therein are composed of a plasticizer and a polymer of good miscibility therewith. Such a plastisol provides a gel of excellent flexibility, but it has such a viscosity as increases with time, and hence it is poor in storability. On the other hand, some of the plastisols proposed are composed of a plasticizer and a polymer of insufficient miscibility therewith. Such a plastisol has a good storability at normal temperatures, but it provides a hard and brittle gel which can not be put to practical use.

A plastisol is also proposed in Japanese Patent Laid-open No. 54-117553 which is comprised of polymethyl methacrylate or copolymers of methyl methacrylate covered with polycarboxylic acid salts dispersed in a plasticizer. This plastisol is still attended by such problems as above mentioned, and will not take the place of polyvinyl chloride plastisol.

A core-shell polymer is described in U.S. Pat. No. 4,199,486 which is comprised of a core layer miscible with a plasticizer and a shell layer immiscible with a plasticizer and having a glass transition temperature of not less than 50° C. Since such a core-shell polymer has no clear boundary between the layers on account of affinity of polymers of the layers to each other, so that such a core-shell polymer has the following disadvantages when it is used in a plastisol. Firstly, when the shell layer is composed of a thin layer of polymer, the surface of the core-shell polymer has no fixed miscibility with a plasticizer, and hence the resultant plastisol formed of such a core-shell polymer dispersed in the plasticizer is poor in storability. Secondly, if the shell layer is made thick to attain storability, the core-shell polymer has a large proportion of shell layer which is immiscible with the plasticizer, but also has a high glass transition temperature, and hence the resultant plastisol formed of such a core-shell polymer provides a brittle gel short of elongation.

BRIEF SUMMARY OF THE INVENTION

The present inventors have made investigations to solve the above mentioned problems and obtain a plastisol which may take the place of polyvinyl chloride plastisol from the standpoint of development of a new core-shell polymer and its use in a plastisol, and have attained a remarkable improvement in the properties of plastisol by the use of such a new core-shell polymer having a specific structure.

It is, therefore, an object of the invention to provide a plastisol which contains fine particles of such a core-shell polymer, and has the following improved properties: it has fluidity suitable for use at normal temperatures; it has an excellent storability so as to be free from increase of viscosity and gellation with time during storage over a long period of time; and it has high miscibility with a plasticizer so that no plasticizer exudes from the inside to the surface of the resultant gel; and in addition, it provides a gel having a sufficient mechanical strength so that it may take the place of conventional polyvinyl chloride plastisol.

It is a further object of the invention to provide such a core-shell polymer suitable for the production of such a plastisol as above mentioned.

According to the invention, there is provided a core-shell polymer which comprises:

(a) a core layer polymerized from a monomer mainly comprising an aromatic monovinyl monomer; and (b) a shell layer polymerized from a monomer mixture which comprises:

(b1) 25–95% by weight of an aromatic monovinyl monomer as a first monomer;

(b2) 5–40% by weight of at least one monomer selected from the group consisting of an α, β-ethylenically unsaturated carboxylic acid and a hydroxyalkyl ester of α, β-ethylenically unsaturated carboxylic acid as a second monomer; and (b3) 0–70% by weight of a third monomer which is other than the first and second monomers and is copolymerizable therewith, wherein the shell layer is contained in an amount of 5–70% by weight based on the core-shell polymer, and the core-shell polymer having a weight average particle size of 0.1–50 micrometers.

There is also provided a plastisol according to the invention which comprises such a core-shell polymer dispersed in a liquid dispersion medium, preferably in a liquid plasticizer.

DETAILED DESCRIPTION OF THE INVENTION

The core-shell polymer will be first described.

The core-shell polymer of the present invention can be produced by a multi-stage seed emulsion polymerization method or a multi-stage suspension polymerization method in which a polymer formed in a preceding stage is serially covered with a polymer formed in the following stage in a continuous sequence. When the multi-stage seed emulsion polymerization method is employed, usually a seed latex is prepared by emulsion polymerization of monomers added in a lump, and then seed polymerization is carried out in the presence of the seed latex to form a core latex, followed by repetition of seed polymerization in the presence of core latex, thereby providing a latex of core-shell polymer. The monomer for the seed latex is selected according to the requisites to the core-shell polymer produced. Usually such a monomer as styrene, methyl methacrylate, or ethyl acrylate, or a mixture of these monomers may be used for the preparation of seed latex.

When multi-stage emulsion polymerization is employed to prepare core-shell polymer, there may be used, as well known, as an emusifier, an anionic surfactant such as sodium dodecylbenzene sulfonate or sodium lauryl sulfate; an non-ionic surfactant such as poly(oxyethylene)nonylphenyl ether or sorbitan monolaurate; or a cationic surfactant such as octadecylamine acetate. There may be used, as a polymerization initiator, a peroxide such as potassium persulfate or cumene hydroperoxide, or an azo compound such as 2,2'-azobis(2-amidinopropane) hydrochloride.

In turn, when multi-stage suspension polymerization is employed to prepare core-shell polymer, an organic polymer such as polyvinyl alcohol or hydroxyethyl cellulose or an inorganic substance such as calcium phosphate may be used as a protective colloid. A peroxide or an azo compound such as benzoyl peroxide or 2,2'-azobis(isobutyronitrile) may be used as a polymerization initiator.

For simplicity, the production of core-shell polymer of the invention will be described, taking the case of two-stage polymerization composed of the first stage seed polymerization in the presence of seed latex to prepare a core latex or a latex of polymers to form a core of core-shell polymer, and the second stage seed polymerization in the presence of the core latex to prepare a shell, namely a latex of core-shell polymer.

The first-stage polymerization forms a glassy polymer as a core which is miscible with a plasticizer from a monomer or a monomer mixture mainly comprising an aromatic monovinyl monomer. The aromatic monovinyl monomer used as a core forming monomer includes a styrenic monomer such as styrene, α-methylstyrene, α-chlorostyrene, α-bromostyrene or 3,4-dichlorostyrene, an alkyl vinyl benzene such as vinyl-toluene or ethylvinylbenzene, or a polynuclear aromatic monovinyl hydrocarbon such as vinyl-naphthalene. The aromatic monovinyl monomer may be used singly or as a mixture. In particular, the styrenic monomer is preferred as the aromatic monovinyl monomer, and inter alia, styrene.

In the first-stage polymerization, a non-aromatic vinyl monomer copolymerizable with the aromatic monovinyl monomer may be optionally employed. The non-aromatic vinyl monomer includes, for example, a conjugated aliphatic diene compound of 4–6 carbons such as butadiene, isoprene or chloroprene, an alkyl (meth)acrylate wherein the alkyl has 1–10 carbons such as ethyl acrylate, propyl acrylate, butyl acrylate, cyclohexyl acrylate, 2-ethylhexyl acrylate, methyl methacrylate or butyl methacrylate, or a vinyl cyanide or a vinylidene cyanide such as acrylonitrile or methacrylonitrile.

Further examples of the non-aromatic vinyl monomer include an unsaturated carboxylic acid, preferably an α,β-ethylenically unsaturated carboxylic acid, such as acrylic acid or methacrylic acid, and a hydroxylalkyl ester wherein the alkyl has 1–10 carbons such as hydroxyethyl (meth)acrylate or hydroxypropyl (meth)acrylate. Glycidyl (meth)acrylate may also be used as a non-aromatic vinyl monomer.

In the first-stage polymerization, a cross-linking monomer may be used as a monomer in an amount of not more than 5% by weight, preferably in an amount of not more than 2% by weight, based on the total of the core forming monomers used in the first-stage polymerization. A grafting monomer may also be used as a monomer in an amount of not more than 5% by weight based on the total of the core forming monomers used in the first-stage polymerization. A mixture of cross-linking monomer and grafting monomer may also be used.

The use of cross-linking monomer or grafting monomer together with the core forming monomers as above mentioned provides core-shell polymer particularly suitable for the production of plastisol since the resultant plastisol forms films or molded articles which have improved toughness after suitable heat treatment.

The use of cross-linking monomer or grafting monomer is well known in the field of production of core-shell polymer, as described in U.S. Pat. No. 4,096,202. The cross-linking monomer is a polyfunctional monomer which has a plurality of addition-polymerizable ethylenically unsaturated bonds in the molecule all of which have substantially the same polymerization reactivity. Accordingly, the cross-linking monomer provides a partial reticulated structure with a polymer which forms a core layer of core-shell polymer. Namely the cross-linking monomer provides a partial cross-linked structure in a core layer.

There may be used as such a cross-linking monomer, for example, an aromatic divinyl monomer such as divinylbenzene, or an alkane polyol poly(meth)acrylate such as ethylene glycol diacrylate, butylene glycol diacrylate, hexanediol diacrylate, hexanediol dimethacrylate, oligoethylene glycol diacrylates, oligoethylene glycol dimethacrylates, trimethylolpropane diacrylate, trimethylolpropane dimethacrylate, trimethylolpropane triacrylate or trimethylolpropane trimethacrylate.

The grafting monomer is a polyfunctional monomer which has a plurality of addition-polymerizable ethylenically unsaturated bonds in the molecule at least one of which has a different polymerization reactivity from at least one other of the addition-polymerizable ethylenically unsaturated bonds. The grafting monomer provides a residual level of unsaturation in the resultant polymer particles at or near the surface thereof in the first-stage polymerization, and the residual addition-polymerizable unsaturation participates in the subsequent second-stage polymerization so that at least a portion of the resultant polymer layer or shell layer is chemically attached to the surface of core at the interface.

The preferred grafting monomer is an allyl ester of an ethylenically unsaturated carboxylic acid such as allyl acrylate, allyl methacrylate, diallyl maleate, diallyl fumarate, diallyl itaconate, maleic acid monoallyl ester (half ester), fumaric acid monoallyl ester (half ester) or itaconic acid monoallyl ester (half ester).

In the first-stage polymerization, the aromatic monovinyl monomer, in particular, the styrenic monomer, and inter alia, styrene, is used in an amount of not less than 50% by weight, preferably not less than 80% by weight, of the total of the core forming monomers.

It is particularly preferred from the practical standpoint that the core layer is formed from styrene as the sole core forming monomer or from styrene together with a small amount of a cross-linking monomer, the latter providing a core layer of a cross-linked polymer of styrene.

It is also preferred that the core is formed of a glassy polymer having a glass transition temperature of not less than 30° C., preferably not less than 40° C.

The second-stage polymerization forms a copolymer which is poor in miscibility with a plasticizer and covers the core to form a shell on the core.

The shell layer is comprised of a copolymer polymerized from a monomer mixture comprising:

(b1) 25–95% by weight of an aromatic monovinyl monomer as a first monomer;

(b2) 5–40% by weight of at least one monomer selected from the group consisting of an α, β-ethylenically unsaturated carboxylic acid and a hydroxyalkyl ester of α, β-ethylenically unsaturated carboxylic acid as a second monomer; and (b3) 0–70% by weight of a third monomer which is other than the first and second monomers and is copolymerizable therewith.

The first monomer (b1) for the preparation of the shell layer is an aromatic monovinyl monomer, and is used in an amount of 25–95% by weight, preferably 35–90% by weight, most preferably 45–85% by weight, based on the total of the shell forming monomers used in the second-stage polymerization.

The aromatic monovinyl monomer used includes, for example, a styrenic monomer such as styrene, α-methylstyrene, α-chlorostyrene, α-bromostyrene or 3,4-dichlorostyrene, an alkyl vinyl benzene such as vinyltoluene or ethylvinylbenzene, or a polynuclear aromatic monovinyl hydrocarbon such as vinylnaphthalene. The aromatic monovinyl monomer may be used alone or as a mixture. In particular, the styrenic monomer is preferred as the aromatic monovinyl monomer, and inter alia, styrene.

The second monomer of the shell forming monomers is at least one selected from the group consisting of an α, β-ethylenically unsaturated carboxylic acid and a hydroxyalkyl ester of α, β-ethylenically unsaturated carboxylic acid.

The α, β-ethylenically unsaturated carboxylic acid is exemplified by, for example, acrylic acid, methacrylic acid, α-ethylacrylic acid, β-ethylacrylic acid, α, β-dimethylacrylic acid and α, β-diethylacrylic acid, with methacrylic acid being most preferred. Further examples of α, β-ethylenically unsaturated carboxylic acid way include an unsaturated dicarboxylic acid such as itaconic acid, maleic acid, fumaric acid, citraconic acid, mesaconic acid, methylenemalonic acid or α-methyleneglutaric acid, or their half esters.

The hydroxyalkyl ester of α, β-ethylenically unsaturated carboxylic acid used is preferably an hydroxyalkyl ester of acrylic acid or methacrylic acid wherein the hydroxyalkyl group has 1–10 carbons, and may be exemplified by, for example, hydroxyethyl (meth)acrylate or hydroxypropyl (meth)acrylate, with hydroxyethyl acrylate being most preferred.

Among the second monomers (b2), methacrylic acid or 2-hydroxyethyl (meth)acrylate or a mixture of these is preferred.

The second monomer (b2) is used in an amount of 5–40% by weight, preferably in an amount of 5–35% by weight, and most preferably 5–30% by weight, based on the total of the shell forming monomers used in the second-stage polymerization.

The third monomer may be optionally used in the second-stage polymerization in the preparation of shell layer. The third monomer is such a vinyl monomer that is other than the first monomer (b1) and second monomer (b2), and is copolymerizable therewith. Accordingly the third monomer may include (meth)acrylic acid esters, vinyl cyanides, vinylidene cyanides, aliphatic lower carboxylic acid vinyl esters, unsaturated carboxylic acid amides, maleimides and aliphatic conjugated diene compounds.

More specifically, the acrylic acid ester includes, for example, methyl acrylate, ethyl acrylate, butyl acrylate, 2-ethylhexyl acrylate, cyclohexyl acrylate or glycidyl acrylate; the methacrylic acid ester includes, for example, methyl methacrylate, ethyl methacrylate, butyl methacrylate, 2-ethylhexyl methacrylate or glycidyl methacrylate; the vinyl cyanide or vinylidene cyanide includes acrylonitrile or methacryonitrile; the aliphatic lower carboxylic acid vinyl ester includes vinyl acetate or vinyl propionate; the unsaturated carboxylic acid amide includes acrylamide, methacrylamide, N-methylolacrylamide or N-butoxymethyl acrylamide; the maleimide includes N-phenylmaleimide; and the aliphatic conjugated diene compound includes, for example, butadiene, isoprene or chloroprene. Among the third monomers (b3), methyl methacrylate or acrylonitrile or a mixture of these is in particular preferred.

The third monomer (b3) is used in an amount of 0–70% by weight, preferably in an amount of 5–65% by weight, and most preferably 10–60% by weight, based on the total of the shell forming monomers used in the second-stage polymerization.

In the second-stage polymerization also, such a cross-linking monomer or a grafing monomer may be used together with the monomers above mentioned in an amount of not more than 5% by weight based on the total of the shell forming monomers used in the second-stage polymerization.

The shell layer thus formed in composed of a glassy polymer which is substantially immiscible with a plasticizer at normal temperatures, and has a glass transition temperature not less than 40° C., preferably not less than 50° C., and yet when it is heated at a suitable temperature, it geta mixed with the plasticizer.

The proportion of the core layer and the shell layer of the core-shell polymer of the invention may be designed depending upon the miscibility of each of the layers with a plasticizer used to form a plastisol. However, the core-shell polymer of the invention usually contains the shell layer in an amount of 5–70% by weight, preferably in an amount of 20–50% by weight, based on the core-shell polymer. Accordingly, the core-shell polymer of the invention usually contains the core layer in an amount of 30–95% by weight, preferably in an amount of 50–80% by weight.

The plastisol of the invention comprises the core-shell polymer as above set forth dispersed in a liquid dispersion medium, preferably in an organic liquid plasticizer. After heat-treatment, the plastisol provides a gel which contains the core layer having a good miscibility with the plasticizer and the shell layer having a poor miscibility with the plasticizer, with the layers being present phase-separated fron each other in the gel. When the shell layer is contained in an amount of more than 70% by weight based on the core-shell polymer, the resultant gelled product may be brittle and poor in toughness. However, when the shell layer is contained in an amount of less than 5% by weight based on the core-shell polymer, the core layer may be insufficiently covered with the shell layer so that the resultant plastisol may be reduced in storability.

The core-shell polymer of the invention is basically composed of two layers, the core layer and the shell layer, as above set forth, wherein the core layer has a good miscibility with the plasticizer and the shell layer is substantially immiscible with the plasticizer used at normal temperatures. However, the core layer and shell layer may be composed of a plurality of layers, respectively.

The core-shell polymer of the invention is produced by a multi-stage seed emulsion polymerization method or suspension polymerization method as set forth hereinbefore. By way of example, when the multi-stage seed emulsion polymerization method is employed, a latex which has a weight average particle size usually in the range of 0.1–5 micrometers, preferably of 0.3–2 micrometers, and most preferably of 0.5–1 micrometers, is produced, and then the resultant polymer particles are separated by a freeze-thaw or salting-out procedure, and are then centrifugally dehydrated and dried, thereby to provide a core-shell polymer in the form of powder.

When the core-shell polymer has a weight average particle size of less than 0.1 micrometer, the core layer is not covered sufficiently with the shell layer, so that when such a core-shell polymer is dispersed in a liquid dispersion medium, it will provide a plastisol which is poor in storability. When the core-shell polymer has a weight average particle size of more than 5 micrometers, much time is undesirably needed to complete the polymerization.

When the two-stage suspension polymerization is employed, a suspension which contains polymer particles having a weight average particle size usually of 5–50 micrometers is produced, and are then centrifugally dehydrated and dried, thereby to provide a core-shell polymer in the form of powder.

When the core-shell polymer has a weight average particle size of more than 50 micrometers, much time is undesirably needed to form gelled products by heating a plastisol when it contains such a core-shell polymer.

When a spray-drying technique is used, the core-shell polymer may be directly harvested from the latex or suspension.

The plastisol of the invention can be produced by dispersing the core-shell polymer as above set forth in a liquid dispersion medium, preferably in a liquid plasticizer. The plasticizer is miscible with the core layer, whereas it is immiscible with the shell layer at normal temperatures. But, when the plastisol is heated to a suitable temperature, it becomes miscible with the shell layer, and when the plastisol is cooled back to normal temperature, it forms a gel or a plastigel having a sufficient strength and toughness.

The plasticizer used is not specicifically limited, and any organic liquid plasticizer normally used for the production of the conventional polyvinyl chloride plastisols may be suitably used in the invention. Therefore, the plasticizer usable in the invention includes, for example, a phthalic acid diester such as dibutyl phthalate, dioctyl phthalate, dinonyl phthalate, diisononyl phthalate, didecyl phthalate, ditridecyl phthalate, dilauryl phthalate, octyldecyl phthalate, distearyl phthalate, butylbenzyl phthalate or dibenzyl phthalate: an adipic acid diester such as dioctyl adipate; a sebacic acid diester such as dioctyl sebacate; or an organic phosphate such as tributyl phosphate, tris(2-ethylhexyl) phosphate, tricresyl phosphate, cresyldiphenyl phosphate, diphenyloctyl phosphate or trisisopropylphenyl phosphate. An epoxidated or a polyester plasticizer may also be used.

The amount of the plasticizer in the plastisol of the invention may be determined depending upon the requisites to the plastisol or resultant gels, however, it is usually in the range of 50–200 parts by weight in relation to 100 parts by weight of the core-shell polymer used.

If necessary, the plastisol may contain a cross-linking agent to make the resultant film or molded article tougher. The cross-linking agent is an organic compound which has at least two functional groups, usually two or three, in the molecule reactive to carboxyl or hydroxyl groups or both the groups of the core-shell polymer. The functional groups may be exemplified by, for instance, an epoxy, amino, isocyanate, blocked isocyanate, hydroxyl, N-methylol or N-alkoxymethyl group. Among the compounds as above, a polyepoxy compound having two or more of epoxy groups in the molecule is particularly preferred as the cross-linking agent.

The polyepoxy compound, or usually called epoxy resin, includes, for example, a glycidyl ether type epoxy resin such as a bisphenol A, bisphenol F, or novolak-glycidyl ether epoxy resin; a glycidyl ester type epoxy resin such as a polycarboxylic acid glycidyl ester; or a cycloaliphatic epoxy resin, a glycidyl amine epoxy resin, or a heterocyclic epoxy resin. In particular, an epoxy resin is preferred which has a polyethylene oxide chain in the molecule and hence has a good flexibility, such as XB4122 available from Ciba-Geigy.

The cross-linking agent may be used in an amount of 0.1–50 parts by weight, preferably 0.5–20 parts by weight, in relation to 100 parts by weight of core-shell polymer.

If necessary, the plastisol of the invention may further comprise diluents, inorganic or organic fillers, dyes, pigments, antirusting agents and the like.

The core-shell polymer of the invention has a core layer of a polymer mainly derived of an aromatic monovinyl monomer, preferably of a polymer formed of styrene, either cross-linked or not, and a shell layer of a copolymer polymerized from a monomer mixture comprising an aromatic monovinyl monomer, preferably styrene as a principal monomer. And the plastisol of the invention has fine particles of such a core-shell polymer as above. Thus, the plastisol of the invention has excellent fluidity and storability at normal temperatures, and when it is heated to a temperature usually in the range of 100°–180° C., and then cooled, the plastisol forms a gel in the form of films or molded articles-having a sufficient strength and toughness. Accordingly, the plastisol of the invention may be practically used in place of conventional polyvinyl chloride plastisol, and in particular may be suitably used to form a protective coating in the field of automobiles.

The invention will be described in more detail with reference to examples together with comparative examples. The examples are intended to illustrate the invention only, and should be by no means construed as being limitative of the scope of the invention.

In the examples and comparative examples, all parts are by weight and the abbreviations used therein have the following meanings.

| ABBREVIATIONS | |
|---|---|
| Methyl methacrylate | MMA |
| Butyl methacrylate | BMA |
| 2-Hydroxyethyl methacrylate | HEMA |
| Methacrylic acid | MAA |
| Styrene | St |
| Acrylonitrile | AN |
| 1,4-Butylene glycol discrylate | BGDA |
| 1,6-Hexanediol diacrylate | HDDA |
| Deionized water | DIW |
| Sodium dioctyl sulfosuccinate | SSS |
| Sodium persulfate | SPS |
| Sodium hydrogen carbonate | SHC |
| Diisononyl phthalate | DINP |
| 1,4-Diazabicyclo[2,2,2]octane | DABCO |

Measurement of Properties of Core-Shell Polymer

The weight average particle size of core-shell polymer was measured with a laser particle analyzing system Model LPA-3000 available from Otsuka Electronics Co., Ltd.

Measurement of Properties of Plastisol

The strength at break and the elongation at break was measured with a JIS No. 4 testpiece formed out of sheet 1 mm thick in accordance with the method as prescribed in JIS K-6301. The sheet was prepared by pressing the plastisol at a temperature of 140° C. under a pressure of 100 kgf/cm² for 30 minutes.

The storability is taken to be "good" when a plastisol is stable without gellation over a period of at least ten days at a temperature of 40° C.

Example 1

Production of Core-Shell Polymer A

A three liter capacity polymerization reactor equipped with a reflux condenser was charged with 19 parts of DIW, 0.3 parts of 1% aqueous solution of SSS and 1.3 parts of 1% aqueous solution of SHC, and the charge was heated to 70° C. in a nitrogen stream with stirring. Then, 0.3 parts of St was added and dispersed over a period of ten minutes, after which 7.5 parts of 2% aqueous solution of SPS were added. The charge was reacted for ten minutes to form a seed latex.

An emulsified monomer mixture for the first-stage polymerization composed of 59.7 parts of St, 50 parts of 1% aqueous solution of SSS and 9 parts of 1% aqueous solution of SHC was added to the seed latex continuously over a period of six hours, and then the mixture was heated from 70° C. to 90° C., followed by ageing at a temperature of 90° C. for one hour.

The temperature of the mixture was arranged to 70° C., and then 2 parts of 2% aqueous solution of SPS was added to the mixture, and then an emulsified monomer mixture for the second-stage polymerization composed of 28 parts of St, 6 parts of HAA, 6 parts of MMA, 2 parts of 1% aqueous solution of SSS, 6 parts of 1% aqueous solution of SHC and 30 parts of DIW was added to the mixture continuously over a period of four hours, and then the mixture was heated from 70° C. to 90° C., followed by ageing at a temperature of 90° C. for one hour.

After the completion of the reaction, the reaction mixture was cooled to room temperature, and was then filtered through a 300-mesh stainless steel sieve to provide a latex of core-shell polymer having a solid content of 44.0% and a weight average particle size of 0.68 micrometers. The latex was spray-dried to provide a core-shell polymer A.

EXAMPLES 2–7 AND COMPARATIVE EXAMPLE 1

Production of Core-Shell Polymers B to H

The core-shell polymers B to H were produced from the monomers as indicated in the Table 1.

EXAMPLES 8–15 AND COMPARATIVE EXAMPLE 2

Production of Plastisol and Measurement of Properties of Plastisol

The core-shell polymers A to H prepared in the Examples 1 to 7 and the Comparative Example 1 were each dispersed in a plasticizer optionally together with a cross-linking agent and a catalyst (DABCO) in a weight ratio as shown in the Table 2, thereby providing plastisols. The storability of the plastisol and the properties of film formed out of the plastisol are indicated in the Table 2.

TABLE 1

| | Examples | | | | | | | Comparative Example |
|---|---|---|---|---|---|---|---|---|
| | 1 | 2 | 3 | 4 | 5 | 6 | 7 | 1 |
| Core-shell polymer | A | B | C | D | E | F | G | H |
| Monomers used[1] First-stage: | | | | | | | | |
| St | 60 | 60 | 60 | 59.52 | 59.52 | 60 | 54 | 60 |

TABLE 1-continued

|  | Examples | | | | | | | Comparative Example |
|---|---|---|---|---|---|---|---|---|
|  | 1 | 2 | 3 | 4 | 5 | 6 | 7 | 1 |
| Core-shell polymer | A | B | C | D | E | F | G | H |
| BMA | — | — | — | — | — | — | 6 | — |
| BGDA | — | — | — | 0.48 | — | — | — | — |
| HDDA | — | — | — | — | 0.48 | — | — | — |
| Second-stage: | | | | | | | | |
| St | 28 | 24 | 24 | 24 | 24 | 24 | 24 | 8 |
| MAA | 6 | 4 | 4 | 4 | 4 | — | 4 | 4 |
| HEMA | — | — | — | — | — | 4 | — | — |
| MMA | 6 | 8 | 12 | 8 | 8 | 8 | 8 | 28 |
| AN | — | 4 | — | 4 | 4 | 4 | 4 | — |
| Weight average particle size of core-shell polymer (μm) | 0.68 | 0.73 | 0.66 | 0.67 | 0.71 | 0.69 | 0.65 | 0.71 |

Notes:
[1] Parts by weight

TABLE 2

|  | Examples | | | | | | | | Comparative Example |
|---|---|---|---|---|---|---|---|---|---|
|  | 8 | 9 | 10 | 11 | 12 | 13 | 14 | 15 | 2 |
| (Core-shell polymer used) | A | B | B | C | D | E | F | G | H |
| Constituents of plastisol[1] | | | | | | | | | |
| Core-shell polymer | 100 | 100 | 100 | 100 | 100 | 100 | 100 | 100 | 100 |
| DINP | 75 | 75 | 100 | 100 | 100 | 100 | 75 | 75 | 100 |
| Crosslinking agent[2] | — | — | 6 | 11 | — | — | — | — | — |
| BABCO | — | — | 0.3 | 0.3 | — | — | — | — | — |
| Properties of film | | | | | | | | | |
| Strentgth at break (kgf/cm$^2$) | 27 | 29 | 40 | 25 | 25 | 30 | 26 | 23 | 9 |
| Elongation at break (%) | 400 | 490 | 200 | 230 | 470 | 280 | 420 | 530 | 150 |
| Storability | Good | Good | Good | Good | Good | Good | Good | Good | Good |

Notes:
[1] Parts by weight
[2] Epoxy resin "XB4122" from Ciba-Geygy

What is claimed is:

1. A core-shell polymer which comprises:

(a) a core layer polymerized from a core forming monomer mainly comprising an aromatic monovinyl monomer; and (b) a shell layer polymerized from a shell forming monomer which comprises:

(b1) 25–95% by weight of an aromatic monovinyl monomer as a first monomer;

(b2) 5–40% by weight of at least one monomer selected from the group consisting of an α, β-ethylenically unsaturated carboxylic acid and a hydroxyalkyl ester of α, β-ethylenically unsaturated carboxylic acid as a second monomer; and (b3) 0–70% by weight of a third monomer which is other than the first and second monomers and is copolymerizable therewith, wherein the shell layer is contained in an amount of 20–50% by weight based on the core-shell polymer, and the core-shell polymer having a weight average particle size of 0.1–50 micrometers.

2. The core-shell polymer as claimed in claim 1 wherein the core forming monomer contains a cross-linking monomer in an amount of not more than 5% by weight based on the total of the core forming monomer and the core is formed of a cross-linked polymer.

3. The core-shell polymer as claimed in claim 1 wherein not less than 50% by weight of the total of the core forming monomers is an aromatic monovinyl monomer.

4. The core-shell polymer as claimed in claim 1 wherein not less than 80% by weight of the total of the core forming monomer is an aromatic monovinyl monomer.

5. The core-shell polymer as claimed in claim 1 wherein the aromatic monovinyl monomer in the core forming monomer is styrene.

6. The core-shell polymer as claimed in claim 1 wherein the core layer is composed of a glassy polymer having a glass transition temperature of not less than 30° C.

7. The core-shell polymer as claimed in claim 1 wherein the core layer consists essentially of a polymer of styrene.

8. The core-shell polymer as claimed in claim 1 wherein the core layer consists essentially of a cross-linked polymer of styrene.

9. The core-shell polymer as claimed in claim 1 wherein the shell forming monomer comprises 35–90% by weight of the first monomer, 5–35% by weight of the second monomer, and 5–65% by weight of the third monomer.

10. The core-shell polymer as claimed in claim 1 wherein the shell layer comprises a copolymer having a glass transition temperature of not less than 40° C.

11. The core-shell polymer as claimed in claim 1 wherein the first monomer is styrene, the second monomer is methacrylic acid, and the third monomer is at least one of methyl methacrylate and acrylonitrile.

12. The core-shell polymer as claimed in claim 1 wherein the core layer consists essentially of a non-crosslinked or a cross-linked polymer of styrene, and wherein the shell layer consists essentially of a copolymer polymerized from a monomer mixture of (b1) styrene, (b2) methacrylic acid, and (b3) at least one of methyl methacrylate and acrylonitrile.

13. The core-shell polymer as claimed in claim 12 wherein the shell forming monomer consists essentially of 45–85% by weight of (b1) styrene, 5–30% by weight of (b2) methacrylic acid, and 10–60% by weight of (b3) at least one of methyl methacrylate and acrylonitrile.

14. A plastisol which comprises the core-shell polymer as claimed in any one of claims 1, 2 or 3 to 13 dispersed in a liquid dispersion medium.

15. The plastisol as claimed in claim 14 wherein the dispersion medium is a plasticizer.

16. The plastisol as claimed in claim 15 wherein the plasticizer is a phthalic acid diester.

17. The plastisol as claimed in claim 14 which further comprises a cross-linking agent.

18. The plastisol as claimed in claim 17 wherein the cross-linking agent is an organic compound which has at least two functional groups in the molecule reactive to carboxyl groups or hydroxyl groups or both of these of the core-shell polymer.

19. The plastisol as claimed in claim 17 wherein the cross-linking agent is an epoxy resin having at least two epoxy groups in the molecule.

20. The plastisol as claimed in claim 17 wherein the cross-linking agent is contained in an amount of 0.1–50 parts by weight in relation to 100 parts by weight of the core-shell polymer.

* * * * *